United States Patent [19]

Snyder, Jr.

[11] 3,724,879
[45] Apr. 3, 1973

[54] TUBING COUPLING

[76] Inventor: Clifford H. Snyder, Jr., 103 Cherry Tree Place, Coraopolis, Pa. 15108

[22] Filed: Nov. 22, 1971

[21] Appl. No.: 201,014

[52] U.S. Cl. ............... 285/101, 285/113, 285/342, 285/345, 285/351
[51] Int. Cl. .............................................. F16l 17/00
[58] Field of Search...... 285/101, 113, 351, 342, 106, 285/96, 104, 105, 345

[56] References Cited

UNITED STATES PATENTS

| | | | |
|---|---|---|---|
| 3,186,740 | 6/1965 | Lee | 285/101 |
| 2,837,353 | 6/1958 | Ashbrook | 285/113 X |
| 3,127,196 | 3/1964 | Fabian et al. | 285/113 X |

FOREIGN PATENTS OR APPLICATIONS

| | | | |
|---|---|---|---|
| 156,943 | 6/1954 | Australia | 285/110 |
| 2,003,736 | 11/1969 | France | 285/113 |

*Primary Examiner*—Dave W. Arola
*Attorney*—George Raynovich, Jr.

[57] ABSTRACT

A coupling is provided which sealingly connects a section of smooth cylindrical tubing to a fluid passage. The coupling includes a rigid housing with a deformable initial seal and a deformable secondary seal. The deformable secondary seal is frusto-conical in shape and abuts a frusto-conical surface within the housing. An annular piston is disposed within the housing in contact with the frusto-conical secondary seal. Line pressure directed against the piston by the initial seal causes the secondary seal to be deformed within the frusto-conical chamber of the housing to thereby tightly grip the outer surface of the tubing.

4 Claims, 2 Drawing Figures

PATENTED APR 3 1973  3,724,879

INVENTOR
CLIFFORD H. SNYDER, JR.
BY George Raymorelli
ATTORNEY 3,724,879

TUBING COUPLING

BACKGROUND OF INVENTION

There is a great need for a coupling which can sealingly connect a section of smooth, cylindrical tubing to a fluid passage without distorting or marring the surface of the tubing. It is highly desirable that the tubing conduct high pressure fluid while under a temporary coupling and that the coupling be removable without, in any manner, damaging the tubing.

In many uses, as for example test stands where tubing must be alternately connected to several different fluid passages, a need for a quickly removable coupling which does not mar or distort the surface of tubing has been in evidence. The present invention provides a coupling which meets the foregoing requirements.

SUMMARY

It has been found that the coupling of the present invention, when formed with a secondary frusto-conical seal of deformable poly-vinyl chloride (PVC) produces a coupling which can withstand line pressures of up to 5,000 pounds per square inch when the tubing is of one inch in diameter, and can withstand line pressures up to 10,000 pounds per square inch when the tubing is ¼ inch in diameter.

With the foregoing considerations in mind, it is an object of the present invention to provide an improved tubing coupling.

Another object of the present invention is to provide a tubing coupling which permits a sealing connection between a smooth, cylindrical tubing and a fluid passage.

These and other objects of the present invention will become apparent as this description proceeds in conjunction with the accompanying drawings.

DESCRIPTION

Figure 1:
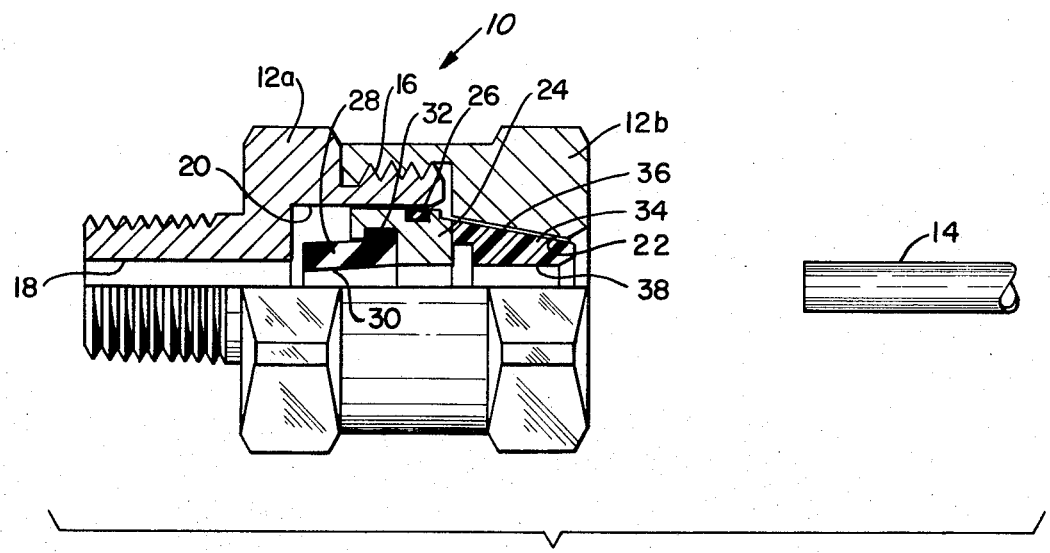
FIG. 1 shows a partial sectional view of the coupling of the present invention in a disengaged position.
Figure 2:
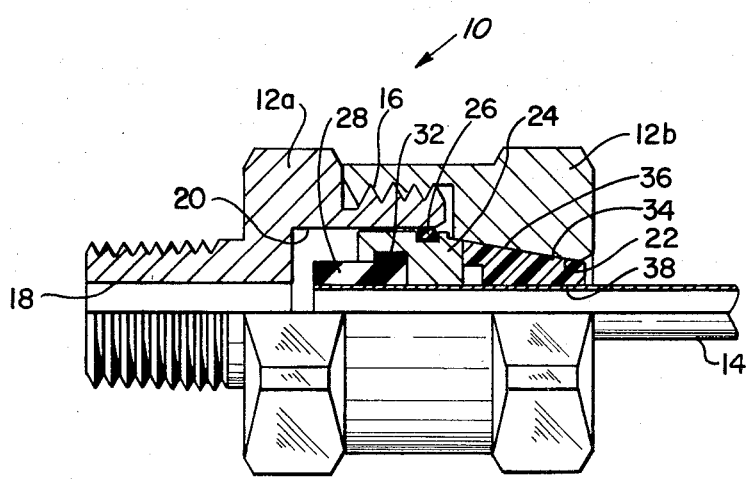
FIG. 2 shows the coupling of the present invention in the engaged position.

Referring to the drawings, there is shown a coupling 10 having a housing formed of two parts, 12a and 12b. The coupling 10 is designed to receive tubing 14 which is ordinary copper tubing of the type utilized extensively in various plumbing applications.

The housing parts 12a and 12b are joined together in assembly by threaded portions 16. A cylindrical fluid passage 18 is formed within the housing.

An enlarged cylindrical chamber 20 is formed within housing part 12a in coaxial relation to the fluid passage 18. A frusto-conical chamber 22 is formed within housing part 12b in coaxial relation to the enlarged cylindrical chamber 20. Frusto-conical chamber 22 is contiguous to chamber 20 and diminishes in diameter toward the tubing entry end of coupling 10.

An annular piston 24 is disposed within the enlarged cylindrical chamber 20 and is free to reciprocate therein. The annular piston 24 has an O-ring 26 on its outer diameter so that piston 24 forms a sliding, sealing fit within cylindrical chamber 20.

An annular initial seal 28 formed of deformable material such as rubber is positioned adjacent to annular piston 24. The annular initial seal 28 has a sealing lip 30 (best shown in FIG. 1) which is of reduced interior diameter so as to form a tight seal when tubing 14 is inserted through the annular initial seal 28. A flange 32 is formed on initial seal 28 so that the seal 28 is held captive axially by the annular piston 24.

An annular secondary seal 34 formed of a deformable material, preferably poly-vinyl chloride (PVC), is positioned within the frusto-conical chamber 22. The annular secondary seal 34 has a frusto-conical exterior surface 36 which conforms to the frusto-conical chamber 22. The secondary seal 34 has a cylindrical internal surface 38 of a size to snugly receive the tubing 14.

When tubing 14 is inserted into coupling 10, the sealing lip 30 and the interference fit between the cylindrical internal surface of annular initial seal 28 insure than an initial seal is created around the tubing 14. Line fluid under pressure then enters chamber 20 and causes the annular piston 24 to be moved within chamber 20 toward the frusto-conical chamber 22.

The motion of annular piston 24 toward frusto-conical chamber 22 causes the deformable annular secondary seal 34 to be forced against the wall of chamber 22. This action causes the secondary seal 34 to be deformed so that the internal cylindrical surface 38 of secondary seal 34 tightly grips the external surface of tubing 14.

A coupling of the present invention designed to receive a 1 inch diameter tubing has successfully connected without leakage the tubing and the fluid passage under a fluid pressure of 5,000 pounds per square inch. Another coupling of the present invention designed to receive a tubing of ¼ inch diameter has successfully retained the tubing under a pressure of 10,000 pounds per square inch.

It may be seen that the coupling of the present invention provides a useful means for sealing a smooth, cylindrical tubing 14 with a fluid passage 18 without marring nor distorting the surface of tubing 14.

According to the provisions of the Patent Statute, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. A coupling for sealingly connecting a fluid passage to a section of tubing having a smooth cylindrical external surface without distorting said tubing or marring said cylindrical external surface comprising:
    a. a rigid housing having
        1. a cylindrical fluid passage formed therein,
        2. an enlarged cylindrical chamber coaxial with said fluid passage and formed to receive an annular piston,
        3. a frusto-conical internal surface coaxial with, and extending from, said enlarged cylindrical chamber toward the tubing receiving end of said housing;

b. an annular piston positioned within said cylindrical chamber in sliding sealing relation to the cylindrical surface of said chamber;

c. an annular initial seal formed of deformable material and having an internal surface in the relaxed position having a diameter smaller than the outside diameter of the tubing to be connected by said coupling to thereby form an interference fit when said tubing is inserted into said housing, said annular initial seal being sealingly fixed axially to said annular piston;

d. an annular secondary seal having a frusto-conical outer surface, a smooth cylindrical inner surface and being formed of a deformable material, said annular secondary seal being positioned within said housing frusto-conical inner surface in abutting relation to said annular piston;

said initial seal, upon insertion of said tubing into said housing, creating a fluid tight seal between said initial seal and said tubing whereby line fluid pressure forces said piston against said secondary seal in a manner that said secondary seal is forced toward said housing and deformed against said housing frusto-conical surface to cause said secondary seal to tightly grip said tubing external surface.

2. The coupling of claim 1 wherein said housing is formed in two parts for ease of assembly.

3. The coupling of claim 1 wherein said annular secondary seal is formed of poly-vinyl chloride.

4. The coupling of claim 1 wherein said annular initial seal has an inwardly extending sealing lip in its undeformed condition.

* * * * *